United States Patent
Magner et al.

(10) Patent No.: US 7,607,410 B2
(45) Date of Patent: Oct. 27, 2009

(54) SYSTEM AND METHOD OF CONTROLLING FUEL DELIVERY DURING POSITIVE VALVE OVERLAP OPERATION OF AN ENGINE START

(75) Inventors: Steve Magner, Farmington Hills, MI (US); Xiaoying Zhang, Dearborn Heights, MI (US); John Rollinger, Sterling Heights, MI (US); Mrdjan Jankovic, Birmingham, MI (US); Sue Wagers, Newport, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 549 days.

(21) Appl. No.: 11/423,682

(22) Filed: Jun. 12, 2006

(65) Prior Publication Data

US 2007/0283933 A1    Dec. 13, 2007

(51) Int. Cl.
*F01L 1/34* (2006.01)
(52) U.S. Cl. ............ 123/90.15; 123/348; 123/491
(58) Field of Classification Search .......... 123/90.15, 123/90.16, 90.17, 90.18, 347, 348, 297, 305, 123/339.1, 523, 491
See application file for complete search history.

(56) References Cited

U.S. PATENT DOCUMENTS

| | | | |
|---|---|---|---|
| 5,215,061 A | 6/1993 | Ogawa et al. |
| 5,357,932 A | 10/1994 | Clinton et al. |
| 5,474,052 A | 12/1995 | Aquino et al. |
| 5,626,109 A | 5/1997 | Yasumura et al. |
| 6,003,496 A | 12/1999 | Maloney |
| 6,644,286 B2 | 11/2003 | Kapolnek et al. |
| 6,729,304 B2 | 5/2004 | Fujiki et al. |
| 2004/0015287 A1 | 1/2004 | Ilzuka et al. |

OTHER PUBLICATIONS

Pfalzgraf, et al., "First ULEV Turbo Gasoline Engine—The Audi 1.8 I 125 kW 5-Valve Turbo", SAE Technical Paper No. 2001-01-1350, Mar. 5-8, 2001, Detroit, Michigan.

Kidokoro, et al., "Development of PZEV Exhaust Emission Control System", SAE Technical Paper No. 2003-01-0817, Mar. 3-6, 2003, Detroit, Michigan.

*Primary Examiner*—Ching Chang
(74) *Attorney, Agent, or Firm*—Julia Voutyras; Alleman Hall McCoy Russell & Tuttle LLP

(57) ABSTRACT

An approach is provided for compensating engine fueling during starting conditions in which positive valve overlap is enabled early in the start. In one example, the valve timing is adjusted to increase positive overlap during cold starting conditions, and fuel adjustments are provided to compensate for the evaporation effects of the increased residual push-back.

15 Claims, 4 Drawing Sheets

SYSTEM AND METHOD OF CONTROLLING FUEL DELIVERY DURING POSITIVE VALVE OVERLAP OPERATION OF AN ENGINE START

BACKGROUND AND SUMMARY

Engines may use variable cam timing to vary intake and/or exhaust valve timing to provide various engine operating effects, such as increased fuel economy, increased engine output, increased internal residuals, and more.

Since the above adjustments can affect air-fuel ratio of the combustion cylinders, various approaches may be used to provide fueling adjustments. For example, U.S. Pat. No. 6,729,304 uses the change of cam phase timing between samples to modify the output of the fuel control system. In particular, in this fuel injection control system, when the valve overlap period is changed due to a change in the cam phase, the fuel injection amount is set according to the detected operating conditions of the engine, and then the fuel injection amount thus set is corrected according to the amount of change in the valve overlap period and the wall surface temperature of the intake ports. In this case, the amount of change in the valve overlap period is a parameter in which changes in an internal EGR amount and the amount of intake air due to the change in the valve overlap period are reflected, while the wall surface temperature of the intake ports is a parameter in which a change in the amount of fuel adhering to the wall surface of the intake port, due to the change in the valve overlap period is reflected.

However, the inventors herein have recognized a shortcoming in the above system. If positive valve overlap is used during engine cold starting, especially before intake manifolds and/or intake valves have sufficiently warmed, the residual backflow strips fuel from the port surfaces and back of the intake valves, thereby generating air-fuel combustion errors in the cylinder, even though neither the cylinder air amount nor the intake manifold pressure necessarily correlate with the intake cam timing.

Thus, in one example, in addition to, or in place of, the adjustments of prior approaches, a method is provided for controlling fuel injection into an engine of a vehicle, the engine having a variable valve timing system. The method may include starting engine with the variable valve timing system at a default position; before the engine warms to a warm-up temperature, adjusting the variable valve timing system to increase positive valve overlap of at least one cylinder; and adjusting a fuel injection amount in response to said increase in positive overlap, where said adjustment of fuel provides a decrease in injected fuel to account for an increase in fuel evaporating from the intake valve and/or the intake port as engine temperature warms.

In this way, it is possible to enable a engine to be operated with changes in intake cam timing to allow residual gas from the cylinder to flow back through the intake port at the end of the exhaust stroke (in which the intake valve is starting to open and the exhaust valve is still closing) during engine starting conditions. As such, the above operation may be used as an intended form of exhaust gas recirculation that exploits positive valve overlap to improve pumping losses, reduce NOx formation, and increase fuel evaporation and mixing.

Note that various fuel delivery controls systems may be used that adjust the injected fuel to account for the storage and release of fuel that resides on the intake port and valve surfaces in order to provide the correct amount of fuel in the cylinder. The response of the fuel compensation may be adjusted by estimated manifold pressure and engine coolant temperature.

Also note that the various embodiments herein may be used to augment many different forms of transient fuel compensation.

DETAILED DESCRIPTION

Figure 1:
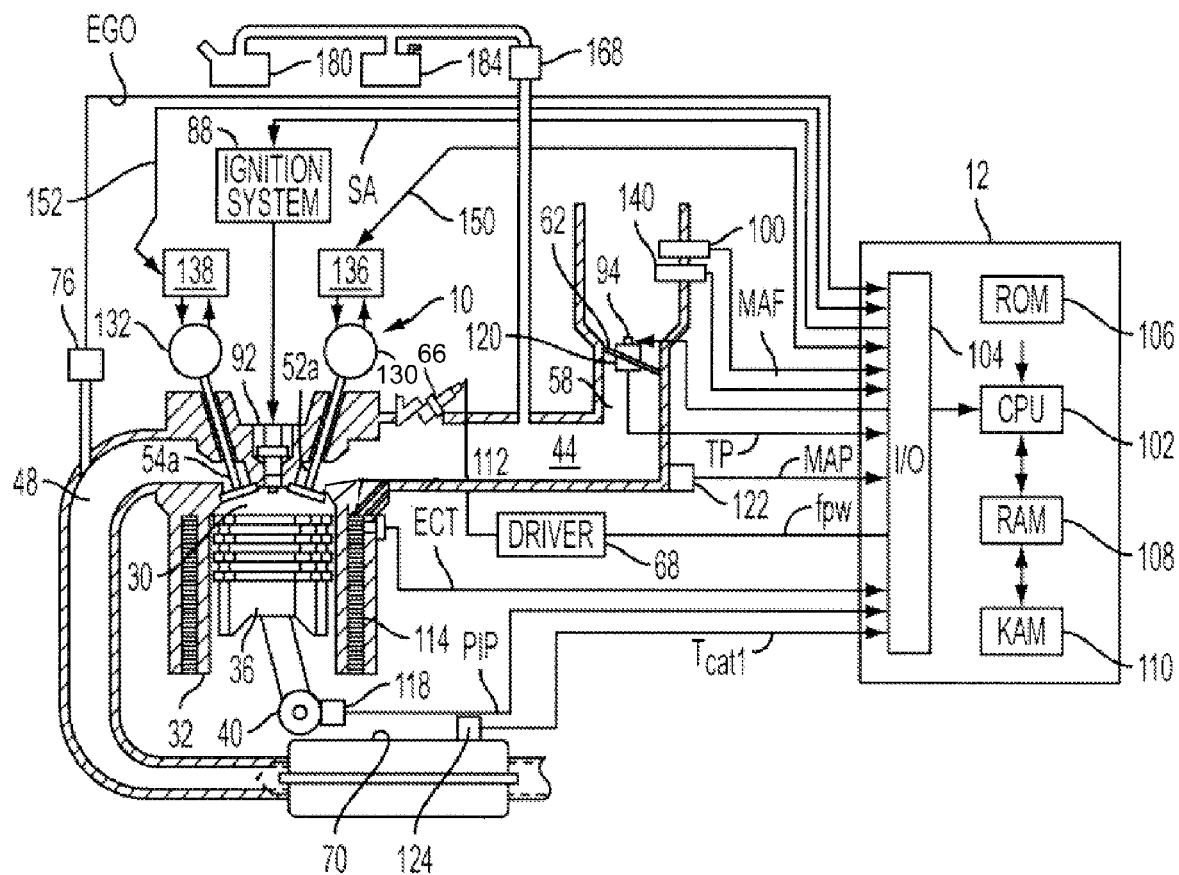
FIG. 1 is a schematic depiction of an internal combustion engine.

FIG. 1 shows one cylinder of a multi-cylinder engine, as well as the intake and exhaust path connected to that cylinder. Continuing with FIG. 1, port injection internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may also be coupled to crankshaft 40 via a flywheel, planetary gearset, accessory drive belt, or other linkage (not shown). Combustion chamber, or cylinder, 30 is shown communicating with intake manifold 44 and exhaust manifold 48 via respective intake valves 52a and 52b (not shown), and exhaust valves 54a and 54b (not shown). While in this example two intake and two exhaust valves are used, alternative valve configurations may also be used, such as, for example, one intake and one exhaust valve, or two intake and one exhaust valves.

Fuel injector 66 is shown coupled to the intake passage, such as an intake port, for delivering injected fuel therein in proportion to the pulse width of signal fpw received from controller 12 via electronic driver 68. The fuel injector may be mounted in the side of the combustion chamber or in the top of the combustion chamber, for example. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a control valve positioned within the air passageway.

Exhaust gas sensor 76 is shown coupled to exhaust manifold 48 upstream of catalytic converter 70. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Ignition system 88 provides an ignition spark to combustion chamber 30 via spark plug 92 in response to spark advance signal SA from controller 12, under select operating modes.

Controller 12 may be configured to cause combustion chamber 30 to operate in various combustion modes. For example, the fuel injection timing may be varied to provide different combustion modes, along with other parameters, such as EGR, valve timing, valve operation, valve deactivation, etc.

The example exhaust emission control device 70 represents one or more catalytic devices, such as three way catalyst, NOx traps, etc. that may be used.

Controller 12 is shown in FIG. 1 as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect (or other type) sensor 118 coupled to crankshaft 40; and throttle position, TP, from throttle position sensor 120; and absolute manifold pressure signal, MAP, from sensor 122. Engine speed signal, RPM, is generated by controller 12 from signal PIP in a conventional manner and manifold pressure signal MAP from a manifold pressure sensor provides an indication of vacuum, or pressure, in the intake manifold. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In this particular example, temperature Tcat1 of device 70 may be inferred from engine operation. In an alternate embodiment, temperature Tcat1 is provided by temperature sensor 124.

Continuing with FIG. 1, engine 10 is shown with an intake camshaft 130 and an exhaust camshaft 132, where camshaft 130 actuates both intake valves 52a,b and camshaft 132 actuates both exhaust valves 54a,b. The valves can be actuated via lift profiles on the camshafts, where the lift profiles between the different valves may vary in height, duration, and/or timing.

For example, actuators 136 and 138 may vary the timing and/or lift of cams 130 and 132, respectively. However, alternative camshaft (overhead and/or pushrod) arrangements could be used, if desired. In one example, actuators 136 and 138 are hydraulic vane type actuators in which hydraulic engine oil (pressured by an engine oil pump) is used to advance/retard the cam/valve timing. In some examples, a locking pin and spring mechanism are utilized to place the actuators in default locked positions if insufficient oil pressure/flow is present to control timing position (e.g., at low speed conditions when the oil is warmed up, during engine stopped conditions, etc.). The locked position may be either fully advanced, or fully retarded, for example.

Note that in one embodiment, only the intake valves may have variable valve actuation, such as variable valve timing, where the exhaust valves have fixed cam timing.

Continuing with FIG. 1, it merely shows one cylinder of a multi-cylinder engine, and it is understood that each cylinder has its own set of intake/exhaust valves, fuel injectors, spark plugs, etc.

Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling intake/exhaust valve timing.

Figure 2:
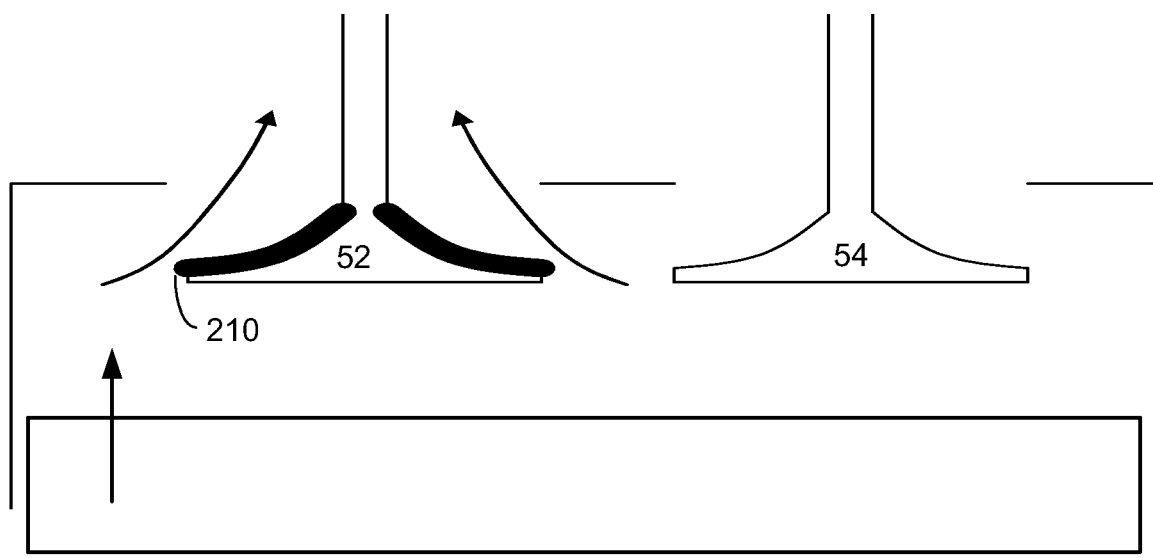
FIG. 2 shows a schematic diagram of a positive valve overlap condition.

As described herein, a control system may operate engine 10 to utilize valve overlap during cold start engine operation in order to reduce cold start emissions. However, as illustrated in FIG. 2, the backflow of combustion gasses from the combustion chamber 30 past the intake valve 52 into the intake manifold 44 may cause fuel from a fuel film 210 to evaporate suddenly. In other words, the hot burnt gas flowing out of the chamber 30 past intake valve 52 may heat the valve 52 and the film 210, causing fuel to suddenly evaporate and mix with gasses in the intake manifold 44, which are then re-inducted in the cylinder (and other cylinders). Further, the amount of flow, which can be a function of the amount of overlap, can affect the amount of evaporated fuel that is present.

The re-induction of the increased evaporated fuel, if not accounted for in the fuel injection, can adversely affect the combustion air-fuel ratio, and increase emissions. Thus, as noted herein, the fuel injection can be adjusted to account for these effects.

Figure 3:
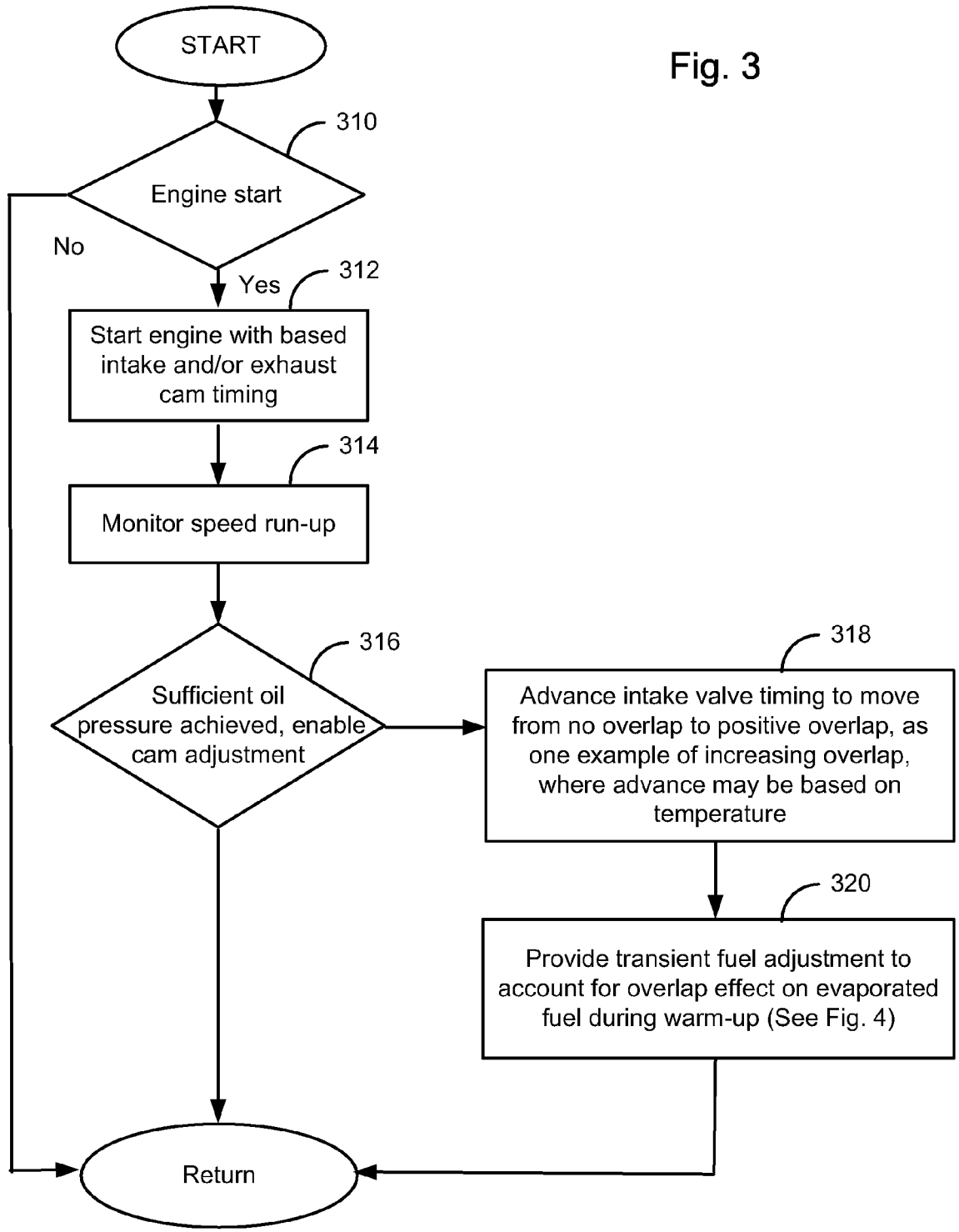
FIGS. 3-4 show example high level flowcharts and/or block diagrams illustrating an routines for engine operation.

Note that the amount of heating and/or evaporation can be correlated to an amount of overlap, the timing of the overlap relative to piston position, etc. The later of these effects may be smaller than the former in terms of the evaporation. However, one or both of these adjustments may generate other transient fuel dynamic adjustments, such as to account for changes in airflow or air charge due to changes in cam timing as valve timing changes. In addition, a change in overlap during negative overlap conditions does not generate any effects from pushback (as no pushback is present under such conditions). Referring now to FIG. 3, an example routine or flowchart illustrates one example approach for controlling engine operation during starting operation. First, in 310, the routine identifies whether an engine start is present. For example, the routine may monitor engine coolant temperature, air temperature, engine off time, key position, etc., to identify such conditions. If so, the routine continues to 312 to start the engine with the intake/exhaust valve timing (e.g., cam timing) at a base timing, which may be a default position. Then, in 314, the routine monitors engine speed run-up and/or oil pressure (such as engine oil pressure used to actuate a variable cam timing mechanism). When sufficient pressure is available to provide adjustment of intake and/or exhaust valve timing (316), the routine continues to 318. Otherwise, the routine returns.

Continuing with 318, the routine advances intake valve timing (and/or exhaust valve timing and/or valve lift) to move from a negative, zero, or low, overlap condition to a positive or more positive overlap condition, as one example of increasing overlap. Further, the routine may adjust spark timing concurrently with intake valve timing, as combustion stability limits, air-fuel ratio stability limits, etc., may vary with valve timing. Further, the routine may continually and/or incrementally increase overlap as temperature continues to increase to maintain appropriate combustion. Spark timing may also be adjusted to maintain desired engine speed, for example where spark timing is retarded to generate increased exhaust gas heat. Further still, the routine may adjust the air-fuel ratio to account for changes in combustion limits as the valve timing changes and/or engine warms.

Next, in 320, the routine provides transient fuel adjustment to account for overlap effects on evaporated fuel during warm-up. In one example, the above adjustments are carried out during a cold engine start. However, during a warmer engine start, less compensation may be provided since less fuel may have built up on back of intake valve and intake manifold, and thus pushback of hot residuals has less of an effect on air-fuel ratio (at least in terms of the vaporization effects). Another example embodiment with additional detail is described herein with regard to FIG. 4.

In this way, it is possible to take advantage of increased overlap once a predetermined number or amount of combustion events has occurred, thereby enabling acceptable combustion operation with the change in valve overlap. Further, it is possible to account for the transient fuel effects caused by the change in overlap, even after the valve movement has decreased. In other words, in some conditions, rather than preventing backflow caused by cam overlap, and its effect on cold intake valves during an engine start, the above approach deliberately advances intake cam timing before the intake valve has warmed to a predetermined temperature, and adjusts the fueling to compensate for the resulting transient fuel effect of the backflow/pushback.

Further, the rate of change of cam timing (or, equivalently, the difference between the current and the previous values of the cam phase) is not what necessarily or solely governs the response of the transient fuel compensator described herein. Rather, (or in addition to such cam phase change compensation) the response may be determined by the dynamics of the fuel puddles that collect on several engine surfaces including the port walls and intake valves. In other words, the process of fuel puddle depletion/accumulation does not necessarily stop when the cam timing stops changing. The processes may continue as the pushback gas flow over the puddle evaporates additional fuel or allows more fuel to accumulate with each injection. The puddle size reaches its steady state when the evaporation and accumulation become substantially equal. A time or duration that takes a puddle to settle at an equilibrium may be much longer than it takes the cam timing to change within its operating range (in many cases, and order of magnitude longer or more). As such, the time constant of the dynamic response characteristic of the fuel puddle may depend on several variables including puddle temperature, manifold air-pressure, and engine speed. A port fuel puddle temperature may be adequately characterized by an engine coolant temperature, known as an ECT, and the valve fuel puddle temperature can also be estimated based on the sensed value of ECT as noted in SAE 982518.

Further, with the above approach, it is possible to provide compensation even if the cam timing changes do not significantly affect engine load/airflow and the corresponding fueling for that load/airflow. This may be especially true in comparison to approaches that rely on gain and/or time constants that are dependent on cam timing/position without the above adjustments. For example, while fuel injection may also be adjusted based via gain and/or time constant adjustments that are dependent on cam timing/position, additional adjustments may also be advantageously provided when such gain/time constant adjustments are insufficient to accurately control air-fuel ratio.

Figure 4:
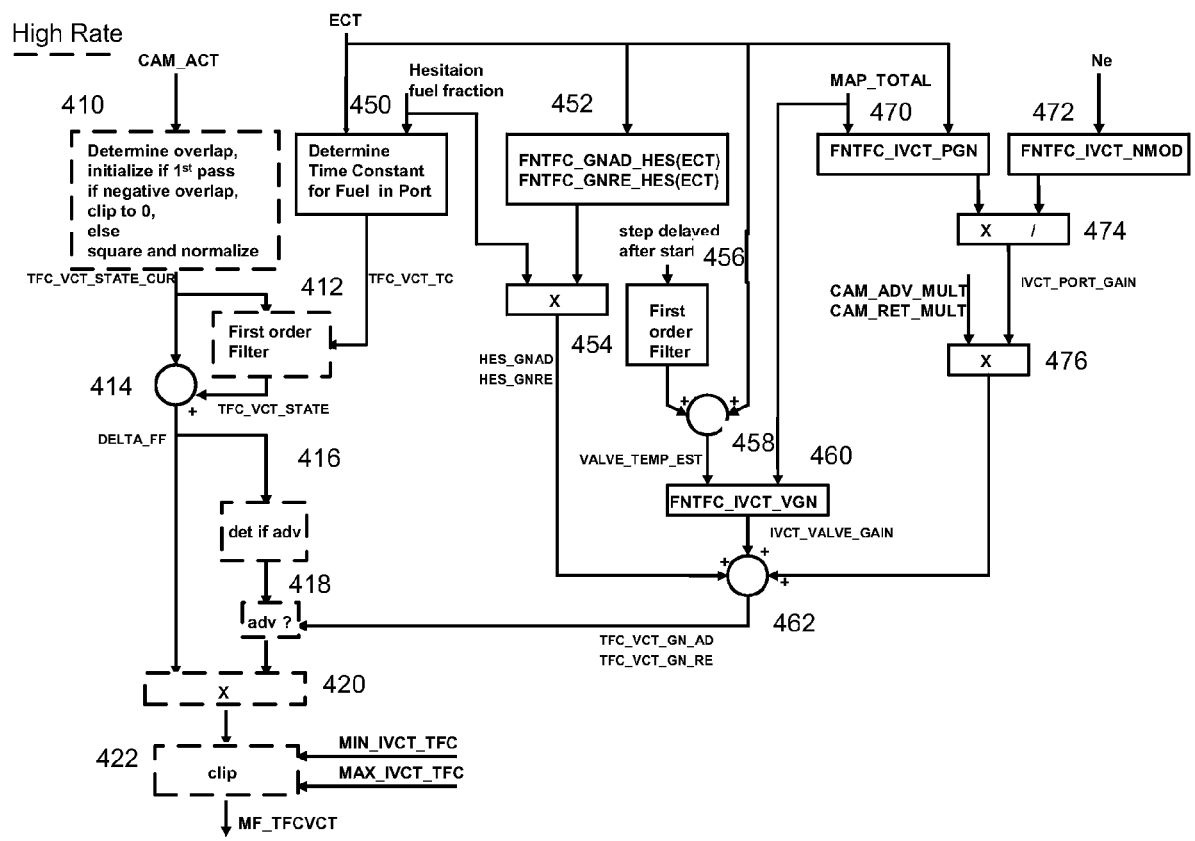

Referring now to FIG. 4, it illustrates addition details of a transient fuel adjustment to a fuel injection amount from the fuel injectors for the engine cylinders, such as injector 66. In general, the routine utilizes a cam timing amount, along with additional parameters, to generate the fueling adjustments.

To generate the above adjustments, the routine may express the intake cam timing as a variable that represents the amount of valve overlap (where the intake and the exhaust valves of a cylinder are open together) that will correlate to backflow of residual gas from the cylinder to the intake manifold (which is then re-inducted into the same and other cylinders). Cam phase measurements may be adjusted to be in terms of piston position, such as the after top dead center (ATDC) reference. The variable can be additionally optionally normalized by dividing by the range of the intake cam phasor so that the variable can be compared to other intake cam equipped engine.

In one embodiment, the amount of flow can be correlated or estimated based on the square of the amount of positive valve overlap. Additional logic is necessary to account for engines in which the intake cam phasor can be adjusted so that negative overlap exists.

Also, depending on the engine configuration, the cylinders may be operated with positive overlap during some conditions and negative overlap during other conditions. During at least some negative overlap, no fuelling adjustment to compensate for pushback effects is used since the pushback is substantially avoided under those conditions.

In one embodiment, an intake cam timing forcing function is used to generate a transient fuel adjustment. This may be used to account for the effect of a cam phasing that changes the/overlap that generates pushback flow which strips fuel from the cold intake valve, thus avoiding or reducing an inadvertent rich air-fuel ratio response.

The forcing function may be a signal whose leading edge is based on the appropriately scaled intake cam phasing. The signal trailing edge is based on the response time of the fuel residing on the port and valve (where the fuel vaporizes more easily as it warms up). A first order transient response can be calculated as the difference of scaled intake cam signal and this same signal filtered using a time constant that is based on the fuel film's temperature (which can be approximated by engine coolant). The presence of hesitation fuel (fuel that does not vaporize as easily as fresh fuel), can be detected or monitored and used to increase the time constant, thus providing a slower fuel injection adjustment.

Further, the forcing function based on intake cam position may be scaled by an overall gain that accounts for the conditions of the fuel residing in the port and on the intake valve. For example, the intake valve surface that faces the port can hold a significant fuel film when cold (ambient conditions), but once exposed to combustion gas and warming from the cylinder side of the valve, may hold less fuel, and possibly no fuel. IN addition, the valve surface may warm up faster and stabilize at a higher temperature than the rest of port, so adjustments to fueling may separately accounts for its contribution to the gain. Both the gain of the port and the valve may be determined by the relevant temperature (e.g., engine coolant for the port and an estimate of surface temperature for valve). A third source of gain adjustment may include the presence or severity of "hesitation" fuel, or fuel that vaporize differently, or less, than fresh fuel, especially when cold. In one embodiment, the gain may be adjusted based on an amount of hesitation fuel and the fuel's temperature. The amount or presence of hesitation fuel may be detected by comparing an expected engine run-up speed to a predicted run-up speed for current temperature conditions, for example.

Referring now specifically to FIG. 4, it describes an example routine that may be implemented in a control system of the vehicle, such as controller 12, at a high enough rate of execution so that the fuel adjustment coincides with engine fuel injector events or at a fixed time that is roughly as frequent as engine events at mid engine speeds. However, only a portion of the routine may respond to a relatively fast forcing function, such as the measured cam phase position (CAM_ACT). Other inputs from the ECU may include engine coolant temperature which changes relatively slowly compared with other parameters, a measurement and/or estimate of intake manifold pressure (MAP_TOTAL), which can change faster than other parameters, such as ECT, but may be used as a reference input (versus a forcing function), engine speed (Ne) which can change moderately fast compared with manifold pressure and ECT, and a variable that indicates the fraction of the fuel that is "hesitation" quality (which may be established shortly after the engine cranks and reaches idle, for example). Portions of the routine that do not use the forcing function input CAM_ACT can be run at a slower rate such as once every 50 or 100 milliseconds. Since the routine uses both one and two input interpolation lookup functions, the slower rate of execution for these calculations may reduce the controller's chronometric load. However, both advance and retard intended gains may be calculated at the slower rate so that the higher rate portion of the routine can select the appropriate gain to use based on CAM_ACT. The presence of two values per signal is illustrated in FIG. 4. If the entire routine of FIG. 4 is only executed at a higher rate, then only the advanced or retarded gains are needed for a given ECU calculation cycle.

The CAM_ACT signal is processed at 410 via the following logic:

```
if (CAM_ACT + IVO_ATDC - EVC_ATDC) > 0, then
    TFC_VCT_STATE_CUR = 0
else
    TFC_VCT_STATE_CUR = ((CAM_ACT + IVO_ATDC -
    EVC_ATDC)/VCT_RNG_NORM)²
end
```

The ATDC relative position indicates that an advanced cam phase is a negative value when advanced beyond 0 ATDC. IVO_ATDC is the default position (cam actuator is turned off) of IVO and EVC_ATDC is the EVC in ATDC relative position. The default position may be a cam timing that the actuator is biased toward via a spring, such as when insufficient oil pressure is present or viscosity is higher than a threshold. Alternatively, for the intake or other VCT, the engine spin forces may be used to push the intake VCT to a retarded default position.

According to the above, which is just one example approach, a positive value of the (CAM_ACT+IVO_ATDC−EVC_ATDC) is a no overlap cam position. No overlap results in no additional fuel compensation due to valve timing/pushback effect on fuel puddles in the intake system since there is insignificant or no back flow or pushback of residual gas. Otherwise, the CAM_ACT measurement may be converted into ATDC relative position, squared and normalized.

The first time the ECU runs this process after engine startup, the TFC_VCT_STATE should be initialized to:

TFC_VCT_STATE=MAX(0, ((EVC_ATDC−IVO_ATDC)/VCT_RNG_NORM)²))

which is the value TFC_VCT_STATE should have at the cam actuator's default condition (CAM_ACT=0).

In 412, the TFC_VCT_STATE_CUR is processed by a first order (or a rolling average algorithm) using a time constant that is obtained from 450. Block 450 may be calculated at a slower rate since it is based on the measured ECT, which even during engine warm-up may change sufficiently slower than other parameters, such as transient fuel compensation. The time constant may be based on the fuel's resistance to vaporization, or its tendency to remain liquid and form a film on the port or valve.

TFC_VCT_STATE=FILTER(TFC_VCT_STATE_CUR, TFC_VCT_TC)

where TFC_VCT_TC is the time constant output of 450.

At 414, the difference between the current and state values is calculated to provide a forcing function delta:

DELTA_FF=TFC_VCT_STATE−TFC_VCT_STATE_CUR

The fuel released to the cylinder can be proportional to (TFC_VCT_STATE_CUR−TFC_VCT_STATE), i.e. there can be a surge of fuel liberated from the liquid fuel film when the residual gas back flows during the valve overlap. The DELTA_FF is the negative of this value, since this is the reaction the fuel injectors must make to keep the fuel that goes into the cylinder at the desired amount.

At 416, the direction of the cam movement may be determined, since the system may be sensitive to cam direction. Since DELTA_FF is a transient response to the fuel effect of the cam movement, the routine may use this value to determine if the system advancing:

```
if (DELTA_FF < CAM_MIN_RATE_ADV) then
    the cam is advancing at or faster than a minimum rate (use advance gain)
else
    the cam is not moving or retarding (use retard gain)
end
```

CAM_MIN_RATE_ADV is a threshold that indicates that the cam is advancing at a fast enough rate to merit the advance gain. Using the ATDC relative position, this threshold will be negative number. Note: if the cam is not changing its phasing, then DELTA_FF will be 0, and the gain will not affect the fuel injection amount since the gain is multiplied by the DELTA_FF (420).

At 418, the high rate portion of the method uses the cam direction determination, provided by 416, to determine which low rate calculated value to use, TFC_VCT_GN_AD (advance gain) or TFC_VCT_GN_RE (retard gain). 420 then multiplies the DELTA_FF and chosen gain to obtain the fuel compensation term.

The fuel compensation term is clipped to a maximum and minimum value in 422. The compensation can remove injected fuel since the fuel film may dissipate for cam advance, or can add fuel injected for cam retard since the fuel film may absorb fuel until reaching an equilibrium condition. The clip value MAX_IVCT_TFC may be a positive value in fuel mass per cylinder event and MIN_IVCT_TFC may be a negative value in fuel mass per cylinder event. The output of 422, and the final output for the routine of FIG. 4, can be a variable MF_TFCVCT, which is in units of fuel mass per engine event. This value can then be used by the fuel injection system of the ECU 12 to adjust the fuel for the cam movement. Note, however, as discussed herein, additional adjustments may be provided based on fuel vapor purging, feedback from exhaust gas oxygen sensors, adjustments to compensate for changes in air charge due to throttle and/or valve adjustments, etc.

450 shows the calculation of two variables that indicate the impact of fuel properties, such as an amount of hesitation fuel, on the time constant that characterizes the liquid fuel film's response to cam movement. ECT may be used as an input to both linear interpolated lookup functions:

TFC_VCT_TC=FNTFC_IVCT_TC(ECT)+FNTFC_TCRE_HES(ECT)*TFC_HES_FRAC where TFC_HES_FRAC is a fraction of hesitation fuel present, which may be estimated and/or determined in a variety of ways. For example, it may be based on a previous engine operation, or may be based on a comparison of the initial engine speed run-up at current temperatures compared to an expected engine speed run-up profile.

452 determines the gains for detected hesitation fuel (versus the time constant contribution). The routine may provide both an advance and retard value so values from two lookup functions may be determined for FNTFC_GNAD_HES (ECT) and FNTFC_GNRE_HES(ECT).

454 multiplies these two results each by the hesitation fuel to determine an advance and retard gain contribution for the hesitation:

HES_GNAD=FNTFC_GNAD_HES(ECT)
    *TFC_HES_FRAC

HES_GNRE=FNTFC_GNRE_HES(ECT)
    *TFC_HES_FRAC 456 provides an estimate of the valve temperature filtering of a step increase, which can be delayed from engine start, and added to ECT (458). The valve's port side surface starts at ECT, ascends above ECT over a short period of time, for example 30 to 60 seconds, depending on valve mass, exposure to combusted gases, etc, and then continues to follow ECT's increase but at a fixed elevated level. This approach may be used to enable characterization of both warmed-up engine operation and engine operation during or before warm-up.

460 uses the estimated valve temperature from 458 and MAP_TOTAL (either measured or estimated manifold pressure) as inputs a two input bilinear interpolation lookup function FNTFC_IVCT_VGN to obtain the gain contribution for the intake valve surface:

IVCT_VALVE_GAIN=FNTFC_IVCT_VGN(VAL-
    VE_TEMP_EST,MAP_TOTAL)

462 adds the three gain contributions together to obtain the final gains for advance and retard:

TFC_VCT_GN_AD=HES_GNAD+IVCT_VALVE_
    GAIN+
    IVCT_PORT_GAIN*CAM_ADV_MULT

TFC_VCT_GN_RE=HES_GNRE+IVCT_VALVE_G-
    AIN+IVCT_PORT_GAIN*CAM_RET_MULT 470 determines the port gain contribution in terms of inputs MAP_TOTAL and ECT. The engine speed, in 472 processed by FNTFC_IVCT_NMOD(Ne) further adjusts the value of this gain in 474. The gain will be reduced as engine speed increases, since the original forcing function is in the crank angle domain, thus the relative time that the back flow interacts with the fuel film at each induction event is reduced as engine speed increases.

IVCT_PORT_GAIN=FNTFC_IVCT_PGN(MAP_
    TOTAL,ECT)/FNTFC_IVCT_NMOD(Ne)

476 multiplies IVCT_PORT_GAIN by each direction specific multiplier (CAM_ADV_MULT and CAM_RET_MULT), which the high rate portion of the routine can select to use based on cam movement.

Note that various adjustments may be made to the above routine. For example, an adjustment may optionally be used to account for a startup condition with some positive overlap, since this initial condition may be compensated without a fuel adjustment.

In this way, it is possible to provide accurate fueling adjustments to account for the evaporation effects caused by increased residual push-back during starting conditions, such as engine cold starting conditions. Further, by considering fuel quality (e.g., via the consideration of hesitation fuel), it can be possible to provide improved fueling performance. Also, another potential advantage over the above approach is that it is not necessary to explicitly or implicitly perform cam measurement differentiation (the difference between measurement samples), thereby providing less vulnerability to cam measurement noise that exaggerates actual cam rate of change. However, such differentiation may be additionally used, if desired.

It should be appreciated that the example control routines described herein are dependant upon the configuration of the vehicle control system. Note that the example control and estimation routines included herein can be used with various engine and/or vehicle propulsion system configurations. The specific routines described herein may represent one or more of any number of processing strategies such as event-driven, interrupt-driven, multi-tasking, multi-threading, and the like. As such, various steps, acts, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps, acts, or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-4, V-6, V-8, I-4, I-6, V-10, V-12, opposed 4, and other engine types. Further, it can be applied to various types of variable valve timing systems, such as variable cam timing, electric valve actuation, etc. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling fuel injection into an engine of a vehicle, the engine having at least a variable intake valve timing system, the method comprising:
    cold starting the engine with the variable valve timing system at a default position;
    before the engine warms to a warm-up temperature, adjusting the variable intake valve timing system to generate an increase in positive valve overlap of at least one cylinder;
    adjusting a fuel injection amount in response to said increase in positive valve overlap, where said adjusting the fuel injection amount provides a decrease in injected fuel to account for an increase in fuel evaporating from the intake valve and/or the intake port as engine temperature warms; and adjusting spark timing in response to said adjusting of the variable intake valve timing system and further to maintain engine idle speed.

2. The method of claim 1 where said adjustment of said fuel injection amount is based on an amount of positive valve overlap.

3. The method of claim 2 where said adjustment continues even if the positive valve overlap remains relatively fixed after said adjustment.

4. The method of claim 1 wherein the variable valve timing system is a variable cam timing system.

5. The method of claim 1 wherein the warm-up temperature is a predetermined engine coolant temperature.

6. The method of claim 1 wherein said positive valve overlap is increased by advancing intake valve timing.

7. A method for controlling fuel injection into an engine of a vehicle, the engine having a variable valve timing system, the method comprising:

starting engine with the variable valve timing system at a default position;

before the engine warms to a warm-up temperature, adjusting the variable valve timing system to increase positive valve overlap of at least one cylinder; and adjusting a fuel injection amount in response to said increase in positive valve overlap, said adjustment of fuel providing a decrease in injected fuel to account for an increase in fuel evaporating from the intake valve, said fuel adjustment based on an amount of pushback residual flow due to said positive valve overlap, where said residual flow is proportional to a square of an amount of overlap between intake and exhaust valves, and then later further decreasing injected fuel to account for transient fuel evaporating from the intake port as the engine temperature warms.

8. The method of claim 7 where said adjustment of said fuel injection amount is based on an amount of positive valve overlap.

9. The method of claim 8 where said adjustment continues even if the positive valve overlap remains relatively fixed after said adjustment.

10. The method of claim 9 wherein the variable valve timing system is a variable cam timing system.

11. The method of claim 10 wherein the warm-up temperature is a predetermined engine coolant temperature.

12. The method of claim 8 wherein said fuel adjustment is based on an intake valve fuel film temperature and intake port temperature.

13. A method for controlling fuel injection into an engine of a vehicle, the engine having a variable valve timing system, the method comprising:

starting engine with the variable valve timing system at a default position and with a fuel film accumulated on an intake valve of the variable valve timing system;

before the engine warms to a warm-up temperature, adjusting the variable valve timing system to increase positive valve overlap of at least one cylinder;

pushing back combusted cylinder gasses past the intake valve into an intake manifold to heat the intake valve;

evaporating the fuel film via said heating of the intake valve;

inducting at least some evaporated fuel from the film into the cylinder; and adjusting a fuel injection amount in response to said increase in positive valve overlap, said adjustment of fuel providing a decrease in injected fuel to account for an increase in fuel evaporating from the intake valve as the engine temperature warms.

14. The method of claim 13 wherein said adjusting of the fuel injection amount is based on a fuel quality and engine speed.

15. The method of claim 14 wherein said adjusting of the fuel injection amount is further based on an intake valve fuel film temperature.

\* \* \* \* \*